United States Patent [19]
O'Brien

[11] Patent Number: 6,093,353
[45] Date of Patent: Jul. 25, 2000

[54] METHOD OF FORMING ELECTRICAL COMPONENTS

[75] Inventor: Timothy F. O'Brien, White Lake, Mich.

[73] Assignee: Lear Automotive Dearborn, Inc., Southfield, Mich.

[21] Appl. No.: 09/128,071

[22] Filed: Aug. 3, 1998

[51] Int. Cl.$^7$ .......................... B29C 70/74; B29C 70/78; H01H 11/04
[52] U.S. Cl. .......................... 264/104; 264/254; 264/255; 29/622
[58] Field of Search .............................. 264/104, 272.11, 264/272.15, 254, 255, 267; 29/622

[56] References Cited

U.S. PATENT DOCUMENTS

| | | | |
|---|---|---|---|
| 3,077,639 | 2/1963 | Siner et al. | 264/272.11 |
| 3,576,518 | 4/1971 | Bazille, Jr. et al. | 439/402 |
| 3,793,612 | 2/1974 | Driscoll | 439/402 |
| 3,985,981 | 10/1976 | Weirick et al. | 200/25 |
| 4,426,339 | 1/1984 | Kamath et al. | 264/104 |
| 4,879,805 | 11/1989 | Tomkinson et al. | 29/622 |
| 5,111,363 | 5/1992 | Yagi et al. | 361/398 |
| 5,242,642 | 9/1993 | Iijima et al. | 264/104 |
| 5,298,215 | 3/1994 | Krause | 264/264 |
| 5,625,536 | 4/1997 | Soyano et al. | 361/736 |
| 5,647,117 | 7/1997 | Kurita | 264/272.11 |
| 5,843,359 | 12/1998 | Kudo et al. | 264/263 |
| 5,864,942 | 2/1999 | Luzzi | 29/622 |

*Primary Examiner*—Angela Ortiz
*Attorney, Agent, or Firm*—MacMillan, Sobanski & Todd, LLC

[57] ABSTRACT

Injection molding techniques are utilized to form complex switches without removal from a molding machine. Multi-shot molding techniques are utilized, as are rotational indexing molding machines. Springs are formed of resilient elastomeric material. Contacts may be inserted into the mold prior to injection of the plastic, or can be formed from conductive plastic. The present method reduces the cost and complexity of forming electrical components.

7 Claims, 2 Drawing Sheets

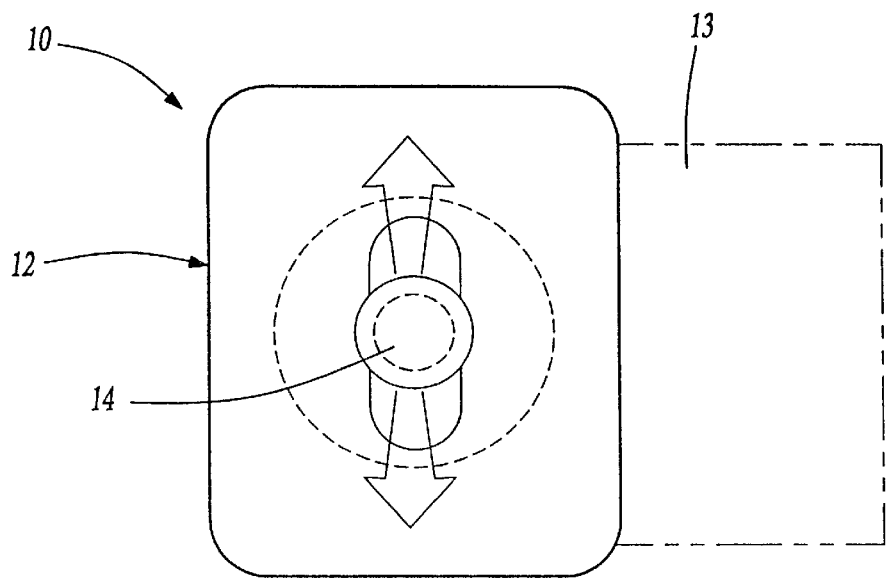
Fig-1
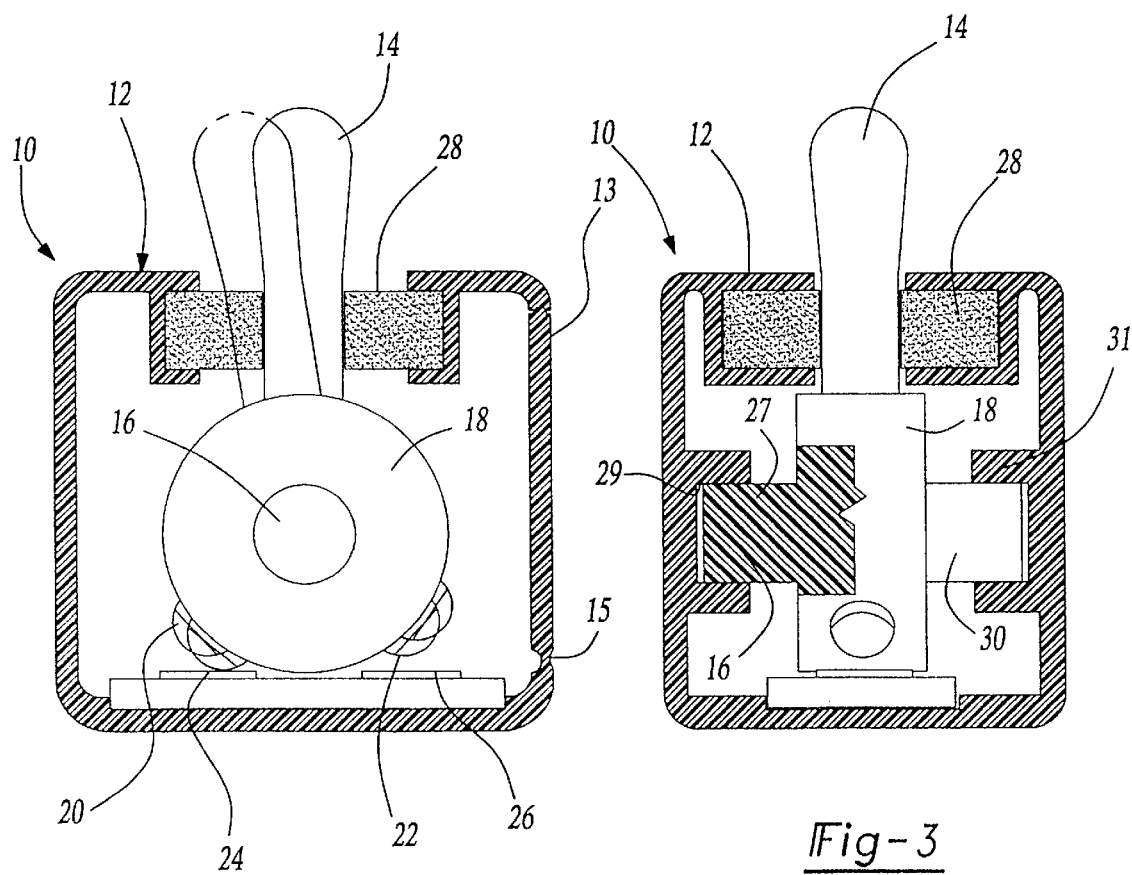
Fig-2
Fig-3

METHOD OF FORMING ELECTRICAL COMPONENTS

BACKGROUND OF THE INVENTION

This invention relates to an improved method of forming electrical components that are predominantly plastic.

Electrical switches and relays are formed of a number of moving parts. The moving parts typically include plastic parts which are structural, and electrically conductive parts which communicate electrical signals between various members. Typically, the electrically conductive parts have been formed of a conductive metal. As an example, copper is often utilized.

Many electrical components have parts which move from different positions to send different signals. Often springs return the part to a non-actuated position. The material for the spring has typically been metal.

In forming the known electrical components, the several parts have typically been manufactured in different locations and then assembled. Due to the small size of the electrical components, this assembly has been very complex and time consuming. Moreover, as electrical components become more and more complex, there are more parts which must be assembled. This increases the complexity of the assembly and the resulting cost.

Recently, injection molding techniques have been developed which eliminate the need for assembling separate parts. As an example, multi-shot molding techniques are known wherein different materials are injected into a mold at different points to form different parts. Further, molding techniques are known wherein a machine indexes a part through several stations, and at each station different molding functions occur. These techniques are known to form different parts which are formed assembled together. However, these techniques have not been successfully applied to forming electrical components.

SUMMARY OF THE INVENTION

In a disclosed embodiment of this invention, electrical components are formed which are predominantly formed of plastic. In some embodiments, components may be formed entirely of plastic, while in other embodiments, all but the small electrical contacts are formed of plastic. Spring are preferably formed of a plastic material.

In the most preferred embodiments of this invention, the electrical components are switches, relays, or other electrical components which have a moving part. The several parts of the electrical components are formed by molding techniques and the entire electrical component is assembled when formed.

In one embodiment, the components are indexed through several molding stations and parts of the electrical components are sequentially molded together. With the present invention, the cost and complexity of forming electrical components is greatly reduced.

The components of forms with housings having a movable door forming with a living hinge. In this way, the housing can be molded around the internal parts, or alternatively, the internal parts molded within the housing, and the door then pivoting closed after completion of the formation steps. This allows the use of the formation techniques as generally known in the prior art.

These and other features of the present invention can be best understood from the following specification and drawings, the following of which is brief description.

BRIEF DESCRIPTION OF THE DRAWINGS

FIG. 1 shows an electrical component according to the present invention.

FIG. 2 is a cross-sectional view through the FIG. 1 component.

FIG. 3 is a cross-sectional view which is perpendicular to the FIG. 2 cross-sectional view.

DETAILED DESCRIPTION OF A PREFERRED EMBODIMENT

Figure 4:
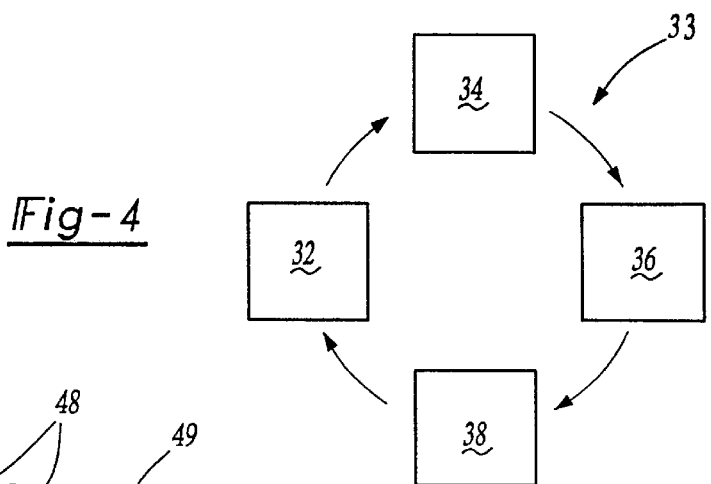
FIG. 4 shows stations in a molding technique for forming the electrical component of FIGS. 1–3.

FIG. 1 shows an electrical component 10, having a housing 12. The electrical component is shown as a simple rotary switch with a moving part 14. It should be understood that this invention extends to any electrical components which have at least one moving part. Relays and other electrical components come within the scope of this invention. Moreover, it is not the detail of any one component which is inventive, but rather the construction and method of manufacturing the components which is inventive. As shown in FIG. 1, a pivoting door 13 allows the interior of housing 12 to be accessible for formation of internal parts, including the moving part 14.

As shown in FIG. 2, the switch moving part 14 can be moved to an actuated position such as shown phantom. Part 14 pivots about an axis 16, to move a switch body 18 such that an electrical contact 20 moves to contact a plate 24. An opposed contact 22 on the opposed side of the switch body 18 is now spaced from a plate 26. Electrically conducted moldable plastics are being developed, and may be utilized for the contact and plate parts in this invention. Alternatively, metal contacts and plates can be used. Door 13 is shown closed, and formed with a living hinge 15. When door 13 is pivoted to the open position such as shown in phantom in FIG. 1, then there will be access to the interior of the housing 12, such that the switch member 14 can be molded within housing 12.

As also shown, an elastomeric resilient member 28 provides a return spring for the part 14. As shown, with the part 14 moved to the left hand position, a bias force is created by the resilient elastomer 28. This bias force will return the part 14 to its centered position once it is released, and cause the contact 20 to move away from the plate 24.

FIG. 3 shows another cross-sectional view, with the pivot axis 16 on a side 27 received in mount structure 29. An opposed pivot side 30 is received in mount structure 31 in housing 12.

A method for forming the inventive switch will now be described with reference to FIG. 4. As shown in FIG. 4, a machine 33 for forming the inventive electrical component 10 includes a first station 32. At first station 32, the housing 12, along with living hinge 15 and door 13 is molded. In one embodiment, electrical contact plates 24 and 26 may be inserted into the mold prior to molding. A worker of ordinary skill in the art would recognize how to properly position these members in the mold such that the molding is properly achieved. Alternatively, the plates 24 and 26 can be molded into the assembly by utilizing known molding techniques and conductive plastics. This step is shown schematically at 34, as occurring after the molding of 32. Although machine 33 is shown as an indexing machine, multi-shot molding techniques may also be utilized to provide the several molding steps of this invention. In known multi-shot molding techniques, different materials are sequentially injected into a mold at different points in time to form the several parts.

Continuing with the method shown in FIG. 4, Step 36 includes the injection molding of the part 14. A mold provides the structure for forming the part 14 integrally within the housing 12. Since at the time, door 13 is pivoted to the outward position shown in phantom at FIG. 1, and the mold will be able to move into the interior of housing 12 to provide proper structure for forming the part 14. The contacts 20 and 22 can be formed similar to the plates 24 and 26. That is, they can be inserted into the mold which is to form the switch part as metal inserts. Alternatively, a multishot molding technique may be utilized to form the contacts 20 and 22 out of a conductive plastic.

The machine then moves to step 38 wherein the elastomeric spring 28 is formed. The elastomeric spring 28 can be formed similar to the other parts by a separate index station, or a multi-shot molding process.

Figure 5:
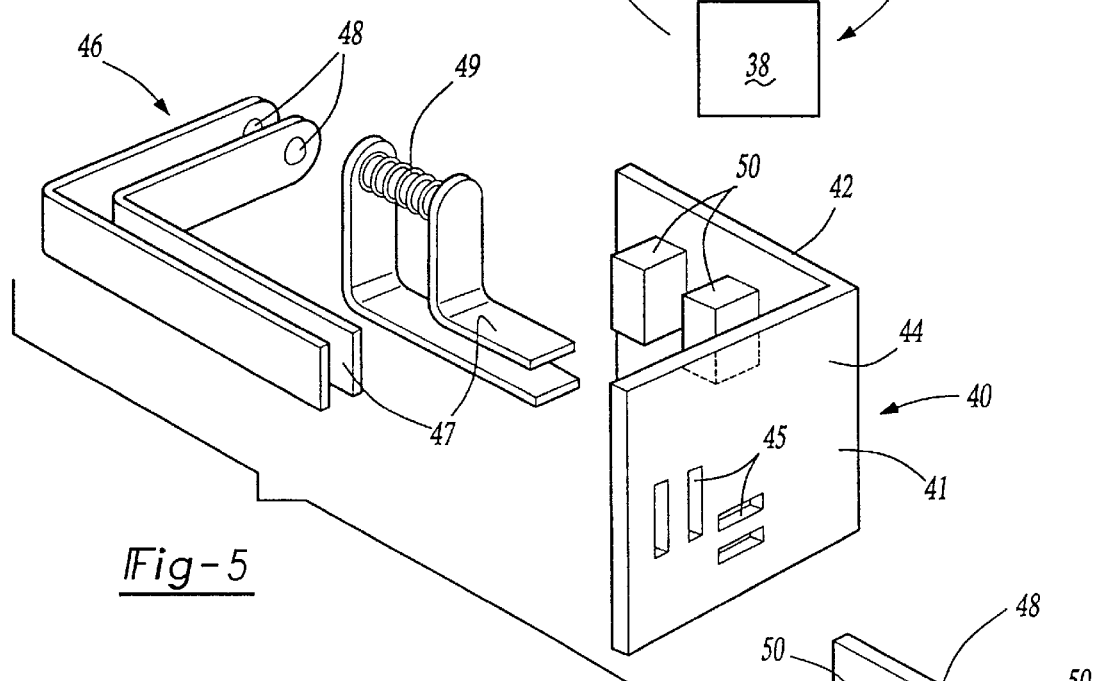
FIG. 5 shows a second type of electrical component.

FIG. 5 shows an initial step in the formation of a relay 40, according to the method of the present invention. Relay 40 includes a base plate 41 having two walls 42 and 44. Openings 45 are formed in wall 44 to receive a part 46. As shown, part 46 has end part portions 47 which extends into openings 45. The part 46 includes movable members 48 which are selectively brought into contact upon actuation of a coil 49. This operation is generally as known in the art, and the functions of the moveable member 48 and coil 49 form no portion of this invention.

Figure 6:
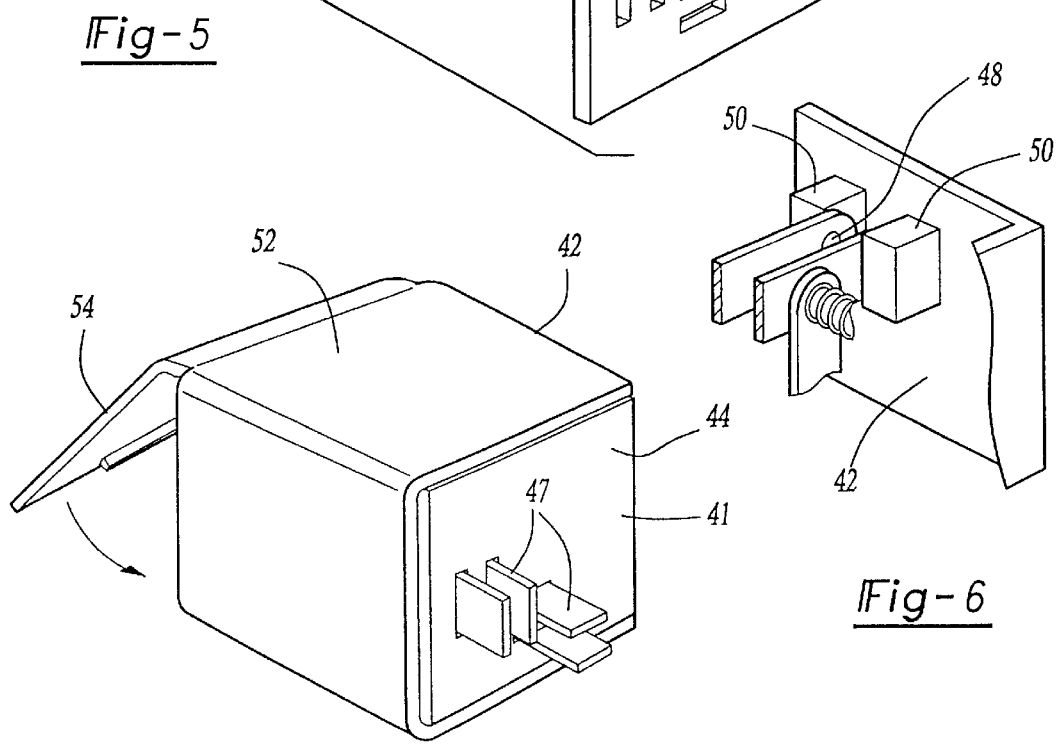
FIG. 6 shows another portion of the FIG. 5 component.

As shown in FIG. 6, spring members 50 return the parts 48 to the position shown in FIG. 5. These spring members 50 are formed on wall 42.

Figure 7:
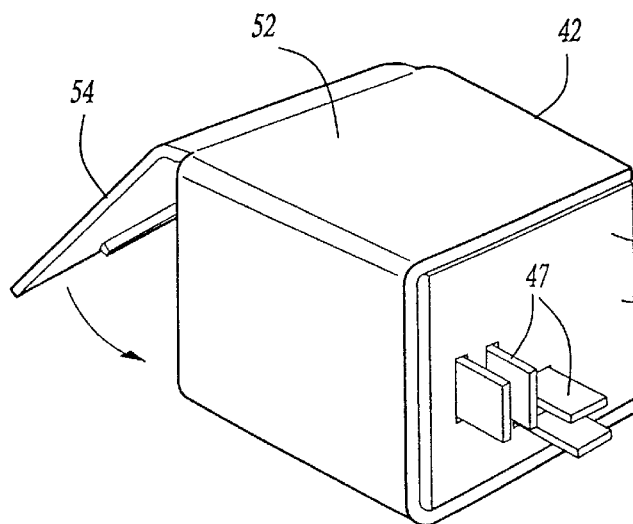
FIG. 7 shows a final step in the formation of this other electrical component.

Finally, FIG. 7 shows a housing 52 having a pivoting door 54 similar to the above described embodiment. Now, with reference to FIG. 5 through FIG. 7, initially the base plate 41 is formed. The end part portions 47, are then either integrally molded into the openings 45, when conductive plastics are utilized, or alternatively are inserted into the mold prior to formation of base plate 41.

Spring members 50 are then molded adjacent to parts 48. The housing 52 and door 54 is then molded to the base plate 41.

Generally, the invention utilizes methods wherein a plurality of parts are molded together at different steps. By selecting different materials, and by sequentially timing the application of the injection of the different materials, the component can be made without removing it from the mold machine during the several formation steps.

After Step 38, the formed electrical component is removed from the machine 33. Door 13 may then be closed, with it then snapping onto the elastomeric part 28. Due to the open door, moveable mold portions can move into the housing for forming the part 28, or any other part. The molding techniques are within the skill of a worker in the art. It is the application of these techniques, and the specific piece of these molding techniques to form electrical components which is inventive here.

The present invention thus provides a method wherein relatively complex electrical components such as switches or relays can be formed entirely in molding techniques. An assembler need not assemble the various moving parts, and thus the cost and complexity of forming the electrical components is greatly reduced.

Preferred embodiments of this invention have been disclosed, however, a worker of ordinary skill in this art would recognize the many modifications of this invention are possible. For that reason, the following claims should be studied the true scope and content of this invention.

What is claimed is:

1. A method of forming an electrical component, the method comprising the steps of:

(a) molding a housing within a mold;

(b) molding electrical contact plates made of conductive plastic material within an interior of said housing after performing step (a) without removing said housing from the mold;

(c) integrally molding a moving part within the interior of said housing after performing steps (a) and (b) without removing said housing from the mold; and (d) molding electrical contacts made of conductive plastic material on said moving part after performing steps (a), (b) and (c) without removing said housing and said moving part from the mold, said electrical contacts capable of contacting said electrical contact plates, whereby said housing is formed having at least one wall with a living hinge, said at least one wall being formed in an open position such that said moving part and said electrical contacts can be molded within said housing prior to moving the at least one wall to a closed position to seal the housing.

2. A method as recited in claim 1, further comprising the step of:

(e) molding an elastomeric spring to contact said moving part when the at least one wall is in the open position after performing steps (a), (b) and (c) without removing said moving part and said housing from the mold.

3. A method as recited in claim 1, wherein said electrical component is a switch.

4. A method as recited in claim 1, wherein said electrical component forms a portion of a relay.

5. A method of forming an electrical component, the method comprising the steps of:

(a) inserting electrical contact plates into a mold, (b) inserting electrical contacts into the mold, said electrical contacts capable of contacting said electrical contact plates;

(c) molding a housing within the mold after said electrical contacts are inserted into the mold; and (d) integrally molding a moving part within an interior of said housing after performing steps (a), (b) and (c) without removing said housing from the mold, whereby said housing is formed having at least one wall with a living hinge, said at least one wall being formed in an open position such that said moving part can be molded within said housing prior to moving the at least one wall to a closed position to seal the housing.

6. A method as recited in claim 5, further comprising the step of:

(e) molding an elastomeric spring to contact said moving part when the at least one wall is in the open position after performing steps (a), (b), (c) and (d) without removing said moving part and said housing from the mold.

7. A method of forming a relay, comprising the steps of:
(a) molding an open base plate in a mold, said open base plate including two walls, one of said two walls having an opening;
(b) molding a moving part made of conductive plastic material to said open base plate after performing step (a) without removing said open base plate from the mold, said moving part including end portions made of conductive plastic material and movable members that can be selectively brought into contact with each other upon actuation of a coil;
(c) integrally molding said end portions into the opening of said open base plate after performing steps (a) and (b) without removing said open base plate and said moving part from the mold;
(d) molding spring members to the other one of said two walls adjacent to said movable members after performing steps (a), (b) and (c) without removing said open base plate, said moving part and said end portions from the mold; and
(e) molding a housing to said open base plate after performing steps (a), (b), (c) and (d) without removing said open base plate, said moving part, said end portions, and said spring members from the mold.

* * * * *